(12) United States Patent
Suzuki

(10) Patent No.: US 12,017,796 B2
(45) Date of Patent: Jun. 25, 2024

(54) TELESCOPIC ROD

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 480 days.

(21) Appl. No.: 17/282,298

(22) PCT Filed: Oct. 1, 2018

(86) PCT No.: PCT/JP2018/036753
§ 371 (c)(1),
(2) Date: Apr. 1, 2021

(87) PCT Pub. No.: WO2020/070779
PCT Pub. Date: Apr. 9, 2020

(65) Prior Publication Data
US 2021/0380274 A1 Dec. 9, 2021

(51) Int. Cl.
*B64F 1/14* (2006.01)
*B64C 27/08* (2023.01)
*B64C 39/02* (2023.01)
*F15B 15/16* (2006.01)
*F16B 7/10* (2006.01)
*B64U 50/34* (2023.01)

(52) U.S. Cl.
CPC ............... *B64F 1/14* (2013.01); *B64C 27/08* (2013.01); *B64C 39/024* (2013.01); *F15B 15/16* (2013.01); *F16B 7/10* (2013.01); *B64U 50/34* (2023.01)

(58) Field of Classification Search
CPC ......... B64F 1/14; B64C 27/08; B64C 39/024; B64C 39/02; F15B 15/16; F15B 7/10; B64U 50/34; B64U 2101/00; F16M 2200/04; F16M 11/18; F16M 11/28; F16M 11/14; F16M 11/2078; G03B 17/561; E04H 12/182; H01Q 1/10
See application file for complete search history.

(56) References Cited

U.S. PATENT DOCUMENTS

| | | | | |
|---|---|---|---|---|
| 5,512,905 A | * | 4/1996 | Nichols | G01C 15/06 342/357.29 |
| 8,534,004 B2 | * | 9/2013 | Wasson | E04H 12/182 52/114 |
| 9,316,345 B2 | * | 4/2016 | Tarnay | F16M 13/022 |
| 10,661,916 B2 | * | 5/2020 | Janssen | G08G 5/025 |
| 10,808,682 B2 | * | 10/2020 | Miranda | F03D 7/026 |
| 2009/0236470 A1 | * | 9/2009 | Goossen | B64F 1/04 244/115 |
| 2011/0079141 A1 | * | 4/2011 | Steury | F15B 21/044 92/163 |
| 2011/0192434 A1 | * | 8/2011 | Young | A45B 11/00 135/20.1 |

FOREIGN PATENT DOCUMENTS

| | | |
|---|---|---|
| JP | H07133999 A | 5/1995 |
| JP | H07237893 A | 9/1995 |
| JP | H08189504 A | 7/1996 |
| JP | 2017052389 A | 3/2017 |
| JP | 2017067122 A | 4/2017 |
| JP | 2018144732 A | 9/2018 |
| WO | WO2015133500 A1 | 9/2015 |

* cited by examiner

*Primary Examiner* — Medhat Badawi
*Assistant Examiner* — Vicente Rodriguez

(57) ABSTRACT

An easy extention of a telescopic rod. The telescopic rod extends in the axial direction by a gas forcibly fed to the inside and is provided with a posture control means.

16 Claims, 19 Drawing Sheets

TELESCOPIC ROD

CROSS-REFERENCE TO RELATED APPLICATION

This application is a national stage application, filed under 35 U.S.C. § 371, of International Patent Application No. PCT/JP2018/036753, filed on Oct. 1, 2018, which is incorporated by reference herein in its entirety.

TECHNICAL FIELD

The present invention relates to a telescopic rod.

BACKGROUND ART

A telescopic rod may be used for photographing or the like from a high place. For example, Patent Literature 1 discloses a telescopic pole that extends and contracts by a hydraulic pressure.

PRIOR ART

Patent Literature

[Patent Literature 1] Japanese Unexamined Patent Publication No. (Hei)7-237893

SUMMARY OF THE INVENTION

Technical Problem

However, the telescopic pole described in Patent Literature 1 is extended by a hydraulic pressure, and its weight increases due to a mechanism for pressure oil leakage or the like.

The present invention has been made in view of such a background, and an object of the present invention is to provide a telescopic rod that can be easily extended.

Technical Solution

The main embodiment of the present invention for achieving the above object provides a telescopic rod that extends in the axial direction by a gas forcibly fed to the inside and is provided with a posture control means.

Other problems disclosed in the present application and technical solutions thereof will be clarified in the embodiments of the invention and the accompanying figures.

Advantageous Effects

According to the present disclosure, it is possible to easily extend a telescopic rod.

DETAILED DESCRIPTION OF THE EMBODIMENTS

The contents of the embodiment of the present invention will be listed and described. The telescopic rod according to an embodiment of the present invention has the following configuration.

[Item 1]

A telescopic rod that extends in the axial direction by a gas forcibly fed to the inside and is provided with a posture control means.

[Item 2]

The telescopic rod as set forth in Item 1, wherein the posture control means includes at least one of a discharge mechanism of the forcibly fed gas, a counterweight, or a rotary blade.

[Item 3]

The telescopic rod as set forth in Item 1 or 2, which is provided with an apparatus fixture at the tip part.

[Item 4]

The telescopic rod as set forth in Item 3, wherein the apparatus is a flight vehicle, the fixture attaches the flight vehicle detachably, and the posture control means controls the posture of the telescopic rod even after the flight vehicle is detached from the telescopic rod.

[Item 5]
The telescopic rod as set forth in any one of Items 1 to 4, which contracts due to suction of the gas.
[Item 6]
The telescopic rod as set forth in any one of Items 1 to 5, which has one or more bendable joints, and
extends at least between the tip part and the joint and at least between the joints.
[Item 7]
The telescopic rod as set forth in any one of Items 1 to 6, wherein the posture control means includes an inclination sensor that detects the inclination of the telescopic rod, and a control mechanism that controls the posture of the telescopic rod according to the inclination of the telescopic rod.
[Item 8]
The telescopic rod as set forth in Item 7, wherein the inclination sensor detects the inclination of the telescopic rod based on a camera that photographs the telescopic rod, and an image photographed by the camera.

Figure 1:
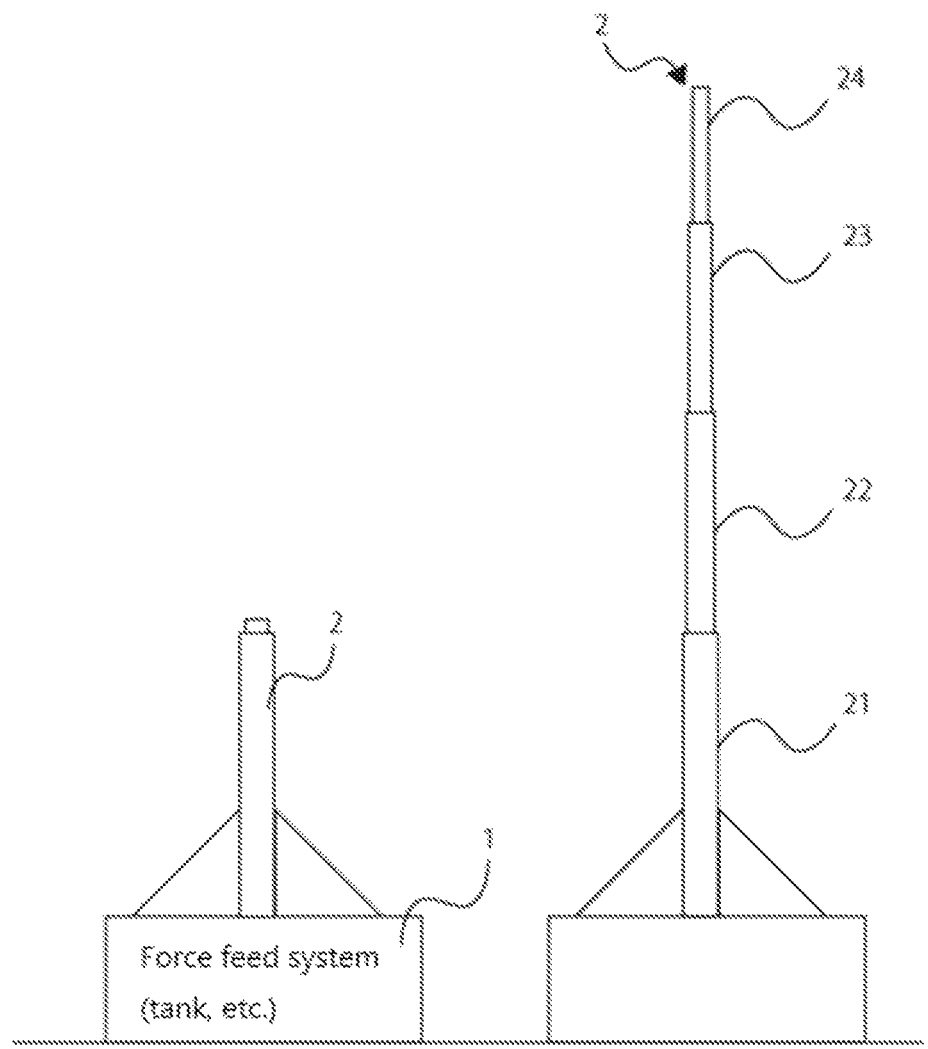
FIG. 1 shows an example of a telescopic rod 2 according to the present embodiment.

FIG. 1 shows an example of a telescopic rod 2 according to the present embodiment. The telescopic rod 2 according to the present embodiment is connected to and fixed to the force feed system 1 which is grounded. The force feed system 1 can be an air compressor or a cylinder that discharges compressed gas, but in the present embodiment, it is assumed that the force feed system 1 is an air compressor. The compressed air fed from a force feed system 1 is forcibly fed toward the inside of the telescopic rod 2, and the telescopic rod 2 is expanded by this compressed air.

FIG. 1 shows an example of the telescopic rod 2 in which a cylindrical body 22 is slidably fitted inside a cylindrical body 21, a cylindrical body 23 is slidably fitted inside the cylindrical body 22, and a cylindrical body 24 is slidably fitted inside the cylindrical body 23. One end of the cylindrical body 21 is connected to the force feed system 1, and compressed air is forcibly fed from the force feed system 1 to the inside. The air forcibly fed to the inside of the cylindrical body 21 is also forcibly fed to the inside of the cylindrical bodies 22 to 24 arranged inside the cylindrical body 21. Of the ends of the cylindrical body 24, the end part opposite to the force feed system 1 is closed. When the force feed air forcibly feeds the inside of the telescopic rod 2 up to the cylindrical body 24, the cylindrical body 24 slides and the telescopic rod 2 extends. When the telescopic rod 2 is extended, the end part of the cylindrical body 24 on the force feed system 1 side (lower side) engages with the side opposite to the force feed system 1 in the cylindrical body 23 (upper side). Similarly, the lower end of the cylindrical body 23 engages with the upper end part of the cylindrical body 22, and the lower end part of the cylindrical body 22 engages with the upper end part of the cylindrical body 21. A stopper (not shown) is provided at least at the lower end part of the body 22 to 24 and the upper end part of the cylindrical body 21 to 23. The left figure of FIG. 1 shows the state of the telescopic rod 2 at the time of contraction, and the right figure of FIG. 1 shows the state of the telescopic rod 2 at the time of extension.

Figure 2:
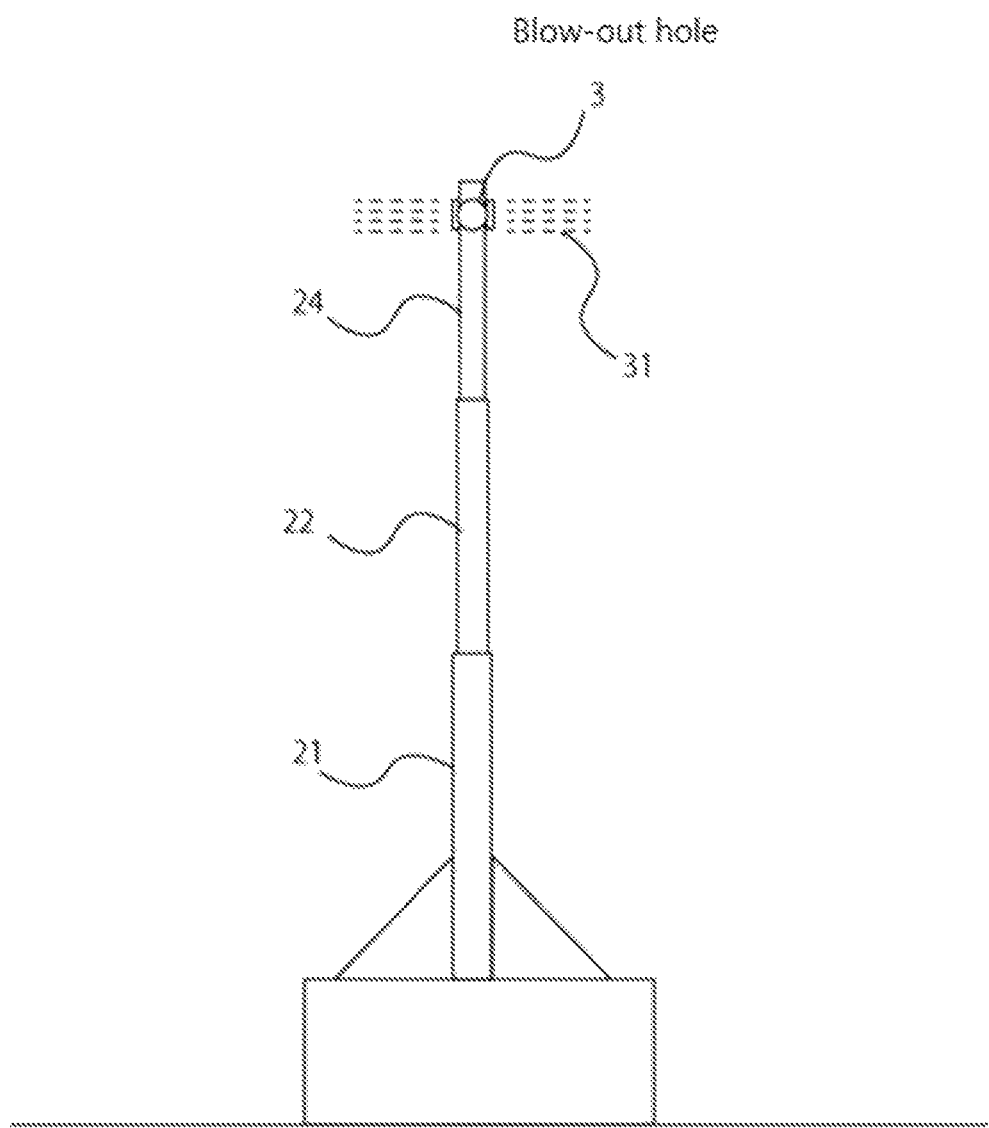
FIG. 2 shows an example of a telescopic rod 2 provided with a force-fed air blow-out hole 3 as a posture control means.

The telescopic rod 2 of the present embodiment includes a posture control means. FIG. 2 shows an example of a telescopic rod 2 provided with a force-fed air blow-out hole 3 as a posture control means. In the example of FIG. 2, a blow-out hole 3 is provided at the end part of the cylindrical body 24 that constitutes the tip part of the telescopic rod 2. The force-fed air 31 is discharged from the blow-out hole 3. The blow-out holes 3 are provided on all four sides, and the posture of the telescopic rod 2 is maintained by discharging the force-fed air from the blow-out holes 3. The amount of air blown out from the blow-out holes 3 is automatically controlled according to the posture of the telescopic rod 2. In the present embodiment, it is assumed that the control of the amount of blown air from the blow-out holes 3 is performed by adjusting the size of the blow-out holes 3. A flap may be provided and adjusted by opening and closing the flap. The posture of the telescopic rod 2 can be detected by an inclination sensor (not shown) such as a gyro sensor. Further, the posture of the telescopic rod 2 may be detected from the outside by a camera or other sensor. For example, the inclination of the telescopic rod 2 can be detected by photographing the telescopic rod 2 with a camera and analyzing the photographed image.

Figure 3:
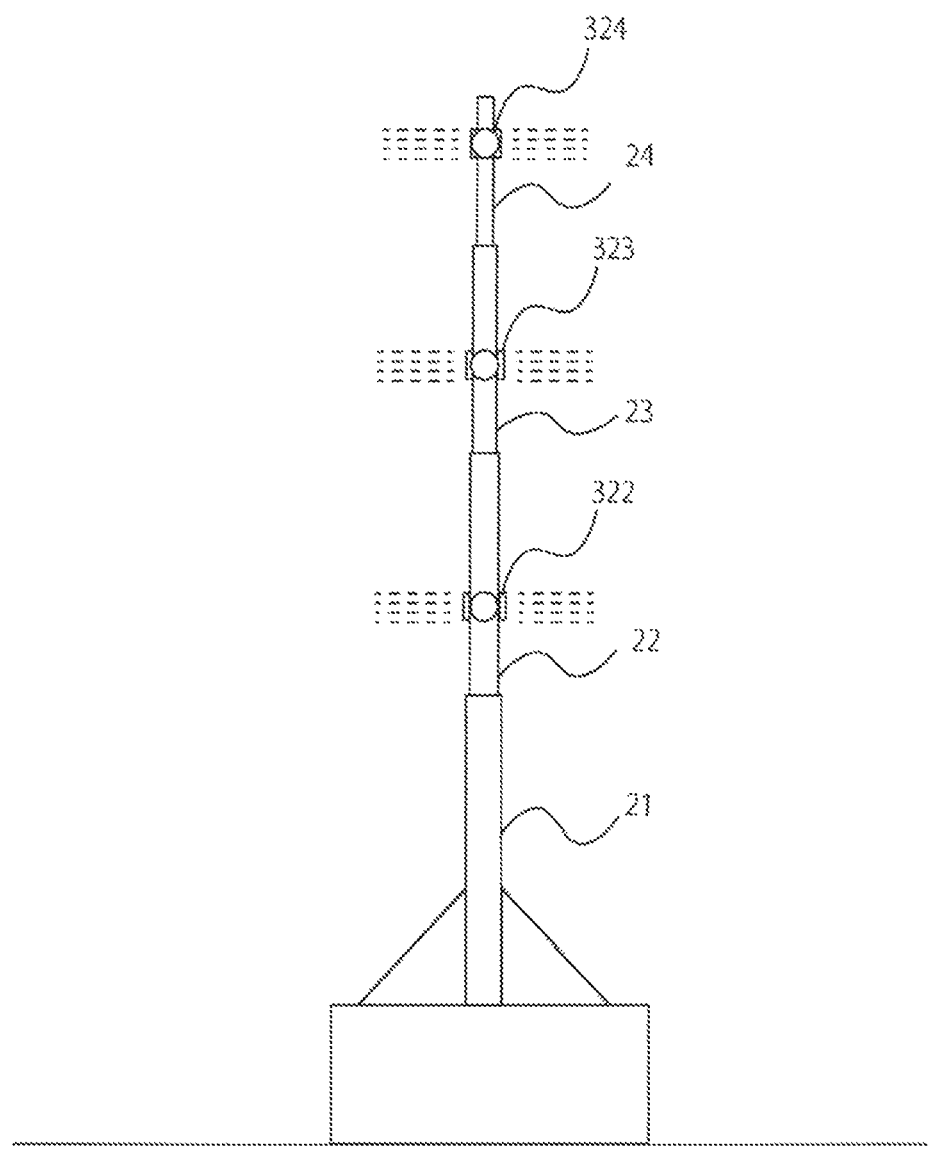
FIG. 3 shows an example of a telescopic rod 2 provided with a plurality of blow-out holes 3 for the posture control means.

FIG. 3 shows an example of a telescopic rod provided with a plurality of blow-out holes 3 as the posture control means. In the example of FIG. 3, blow-out holes 3 are provided in each of the cylindrical bodies 24 to 22. Further, it is preferable that the outlet 3 is provided near the tip part of the cylindrical body 24, but in the other cylindrical bodies 22 and 23, it may be provided at the central part or the lower end part instead of the tip part.

Figure 4:
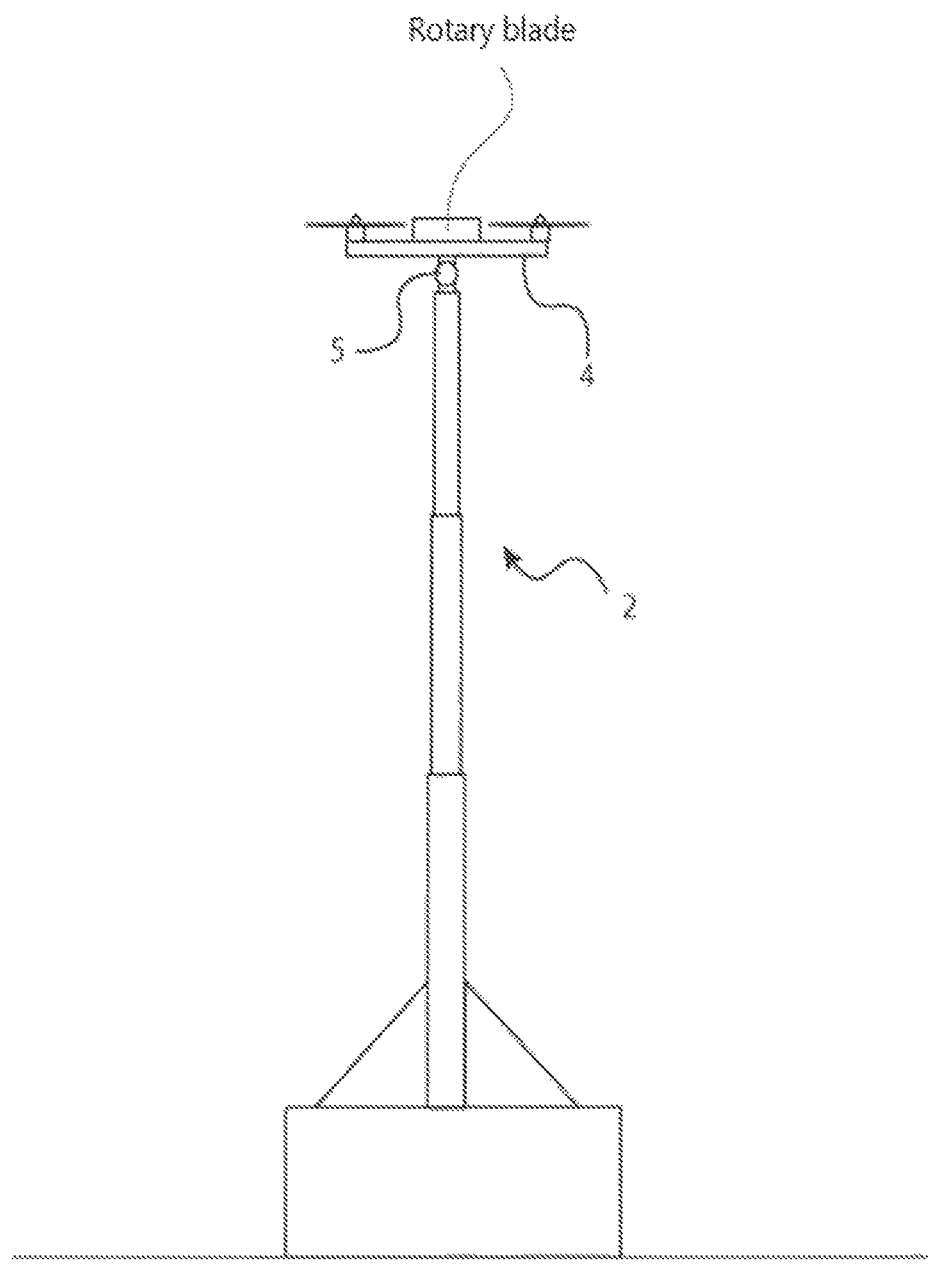
FIG. 4 shows an example of a telescopic rod 2 provided with a rotary wing aircraft 4 as a posture control means.

Rotary wing can also be used as the posture control means. FIG. 4 shows an example of a telescopic rod 2 provided with a rotary wing aircraft 4 as a posture control means. In the example of FIG. 4, a fixture 5 is provided at the tip part of the telescopic rod 2, and a rotary wing aircraft 4 is attached to the fixture 5. The rotary wing aircraft 4 is a flight vehicle having a plurality of rotary wings, and is also called a UAV (Unmanned Aerial Vehicle) or a drone. The rotary wing aircraft 4 can control the rotation of the rotary wing aircraft by remote control of a user using the transceiver. The rotary blade of the rotary wing aircraft 4 rotates, and the posture of the telescopic rod 2 is controlled by the thrust caused by this.

Further, the rotary blade may be provided directly on the telescopic rod 2. For example, a motor mount is provided near the end part of each cylindrical body of the telescopic rod 2 opposite to the force feed system 1. It is possible to control the posture of the telescopic rod 2 by mounting a rotary blade and a motor, and by rotating the rotary blade by the motor, and by using the thrust generated by the rotary blade.

Figure 5:
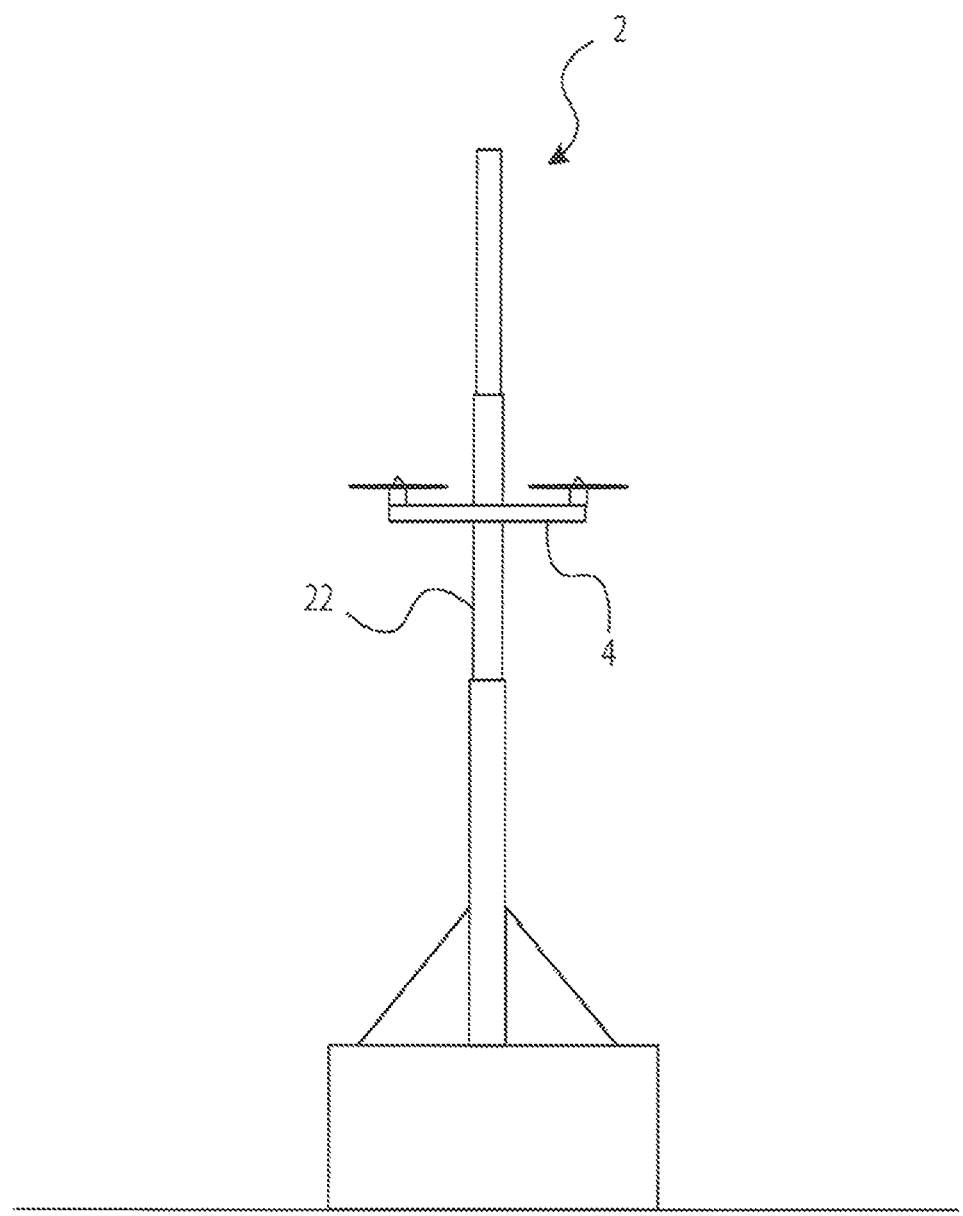
FIG. 5 shows an example in which a rotary wing aircraft 4 is arranged at the central part of a telescopic rod 2.

Further, the position of the rotary blade is not limited to the tip of the telescopic rod 2. The rotary blade may be arranged at an arbitrary position of the telescopic rod 2. FIG. 5 shows an example in which a rotary wing aircraft 4 is arranged at the central part of a telescopic rod 2. A hole part (not shown) is provided around the center of the rotary wing aircraft 4, and the telescopic rod 2 penetrates the hole part of the rotary wing aircraft 4. By controlling the flight of the rotary wing aircraft 4, it is possible to adjust the position where the rotary wing aircraft 4 applies stress to the telescopic rod 2. Further, a stopper may be provided on the cylindrical body 22 of the telescopic rod 2 so as to prevent the rotary wing aircraft 4 from falling.

Figure 6:
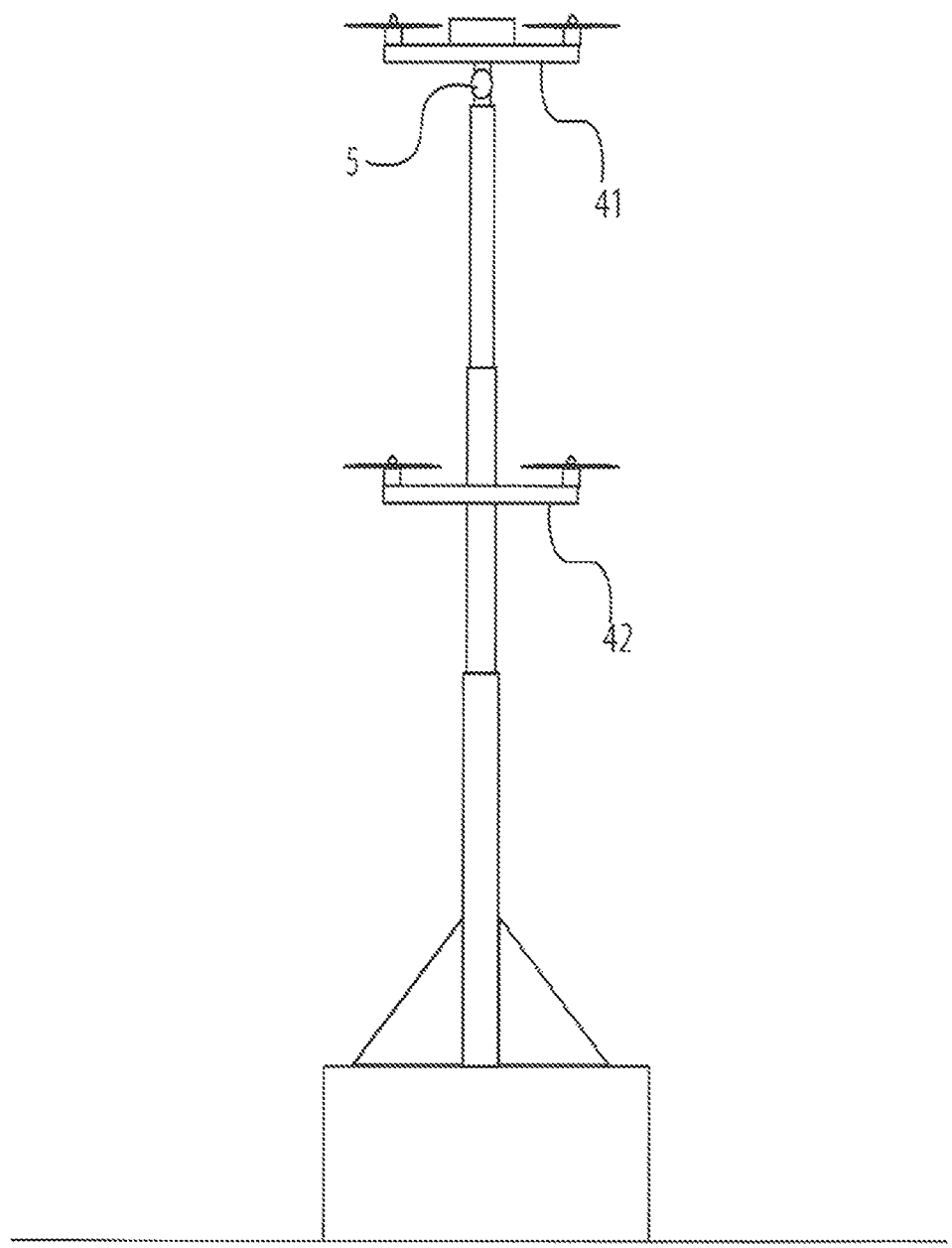
FIG. 6 shows an example in which a plurality of rotary wing aircraft 41 and 42 are arranged on a telescopic rod 2.

A plurality of rotary blades may be provided on the telescopic rod 2. FIG. 6 shows an example in which a plurality of rotary wing aircraft 41 and 42 are arranged on a telescopic rod 2. In the example of FIG. 6, the telescopic rod 2 penetrates the rotary wing aircraft 42 having a hole part, a fixture 5 is provided at the tip part of the telescopic rod 2, and the rotary wing aircraft 41 is attached to the fixture 5.

Figure 7:
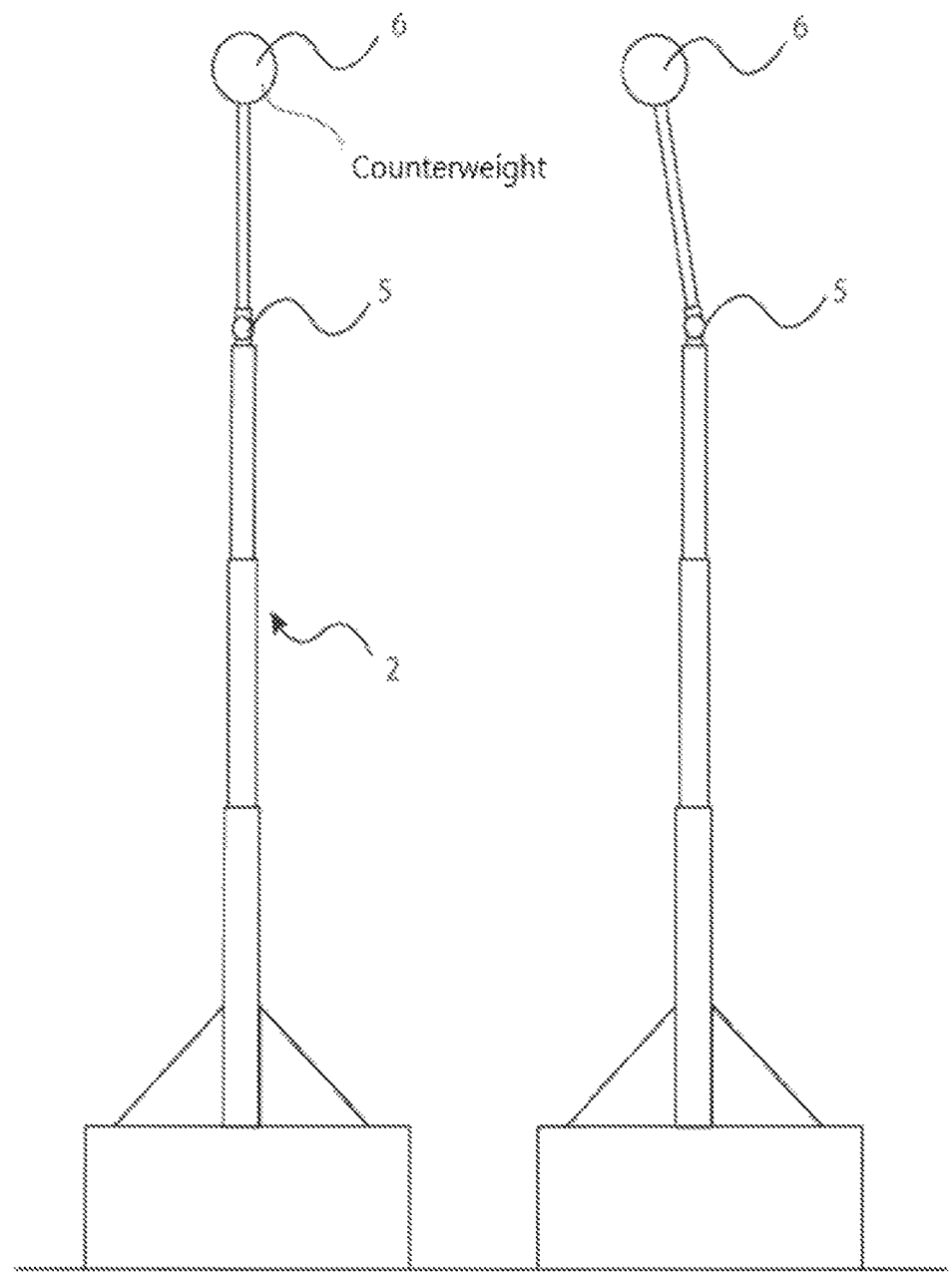
FIG. 7 shows an example in which a counterweight 6 is used as a posture control means.

FIG. 7 shows an example in which a counterweight 6 is used as a posture control means. In the example of FIG. 7, a fixture 5 is provided at the tip of the telescopic rod 2, and a counterweight 6 is rotatably attached to the fixture 5. The left figure of FIG. 7 shows a state in which the counterweight 6 is arranged on the axial extension of the telescopic rod 2, and the right figure of FIG. 7 shows a state in which the counterweight 6 is arranged with an angle from the axial direction of the telescopic rod 2. By providing the counterweight 6 rotatably in the fixture 5 in this way, the center of gravity of the telescopic rod 2 at the time of extension can be adjusted, and the posture can be controlled. The fixture 5 can be a joint having an arbitrary degree of freedom, for example, using a ball joint or the like.

Figure 8:
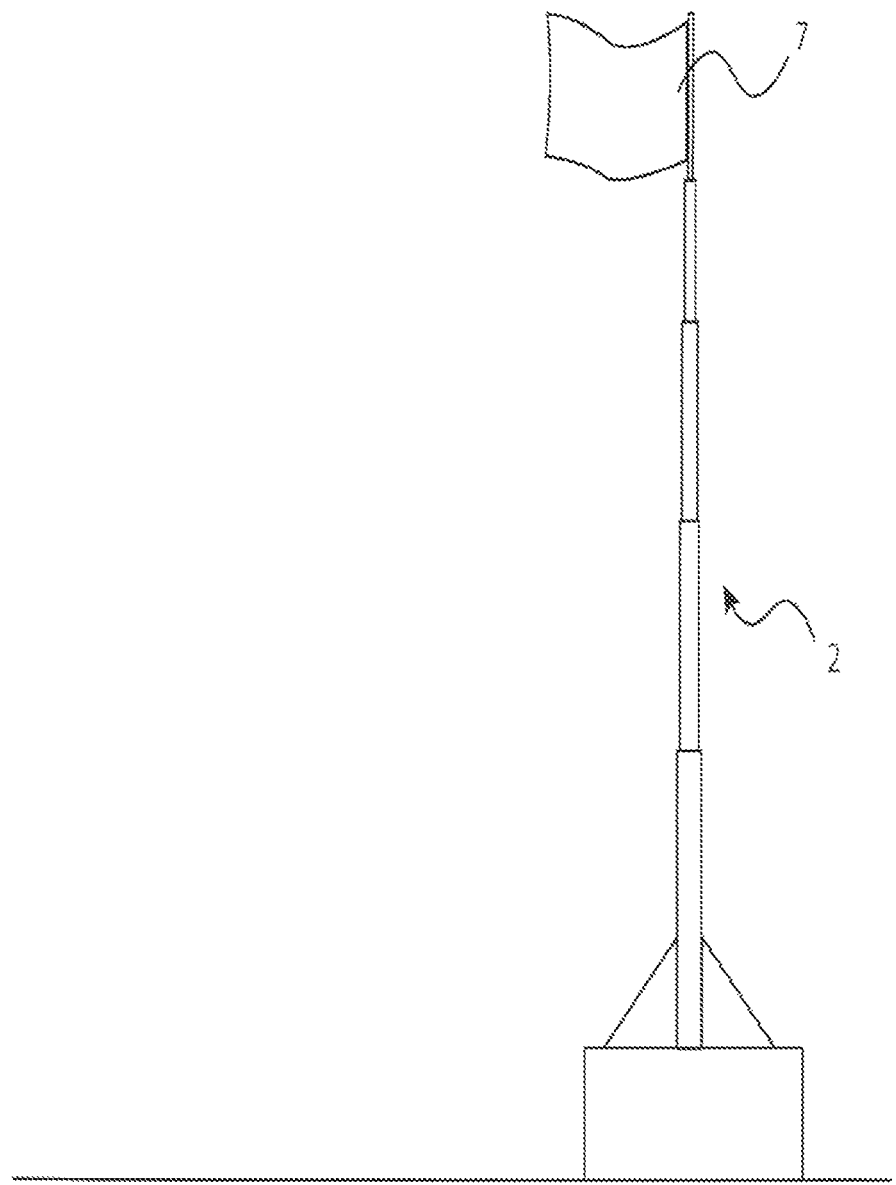
FIG. 8 shows an example in which a flag 7 is mounted on the tip of a telescopic rod 2.

Various objects can be attached to the tip part of the telescopic rod 2. FIG. 8 shows an example in which a flag 7 is mounted on the tip of a telescopic rod 2. That is, the telescopic rod 2 can be used as a pole for raising the flag 7. Further, since the flag 7 can be attached to the telescopic rod 2 in the contracted state, the flag can be directly attached to the telescopic rod 2 without using an apparatus such as a pulley.

Figure 9:
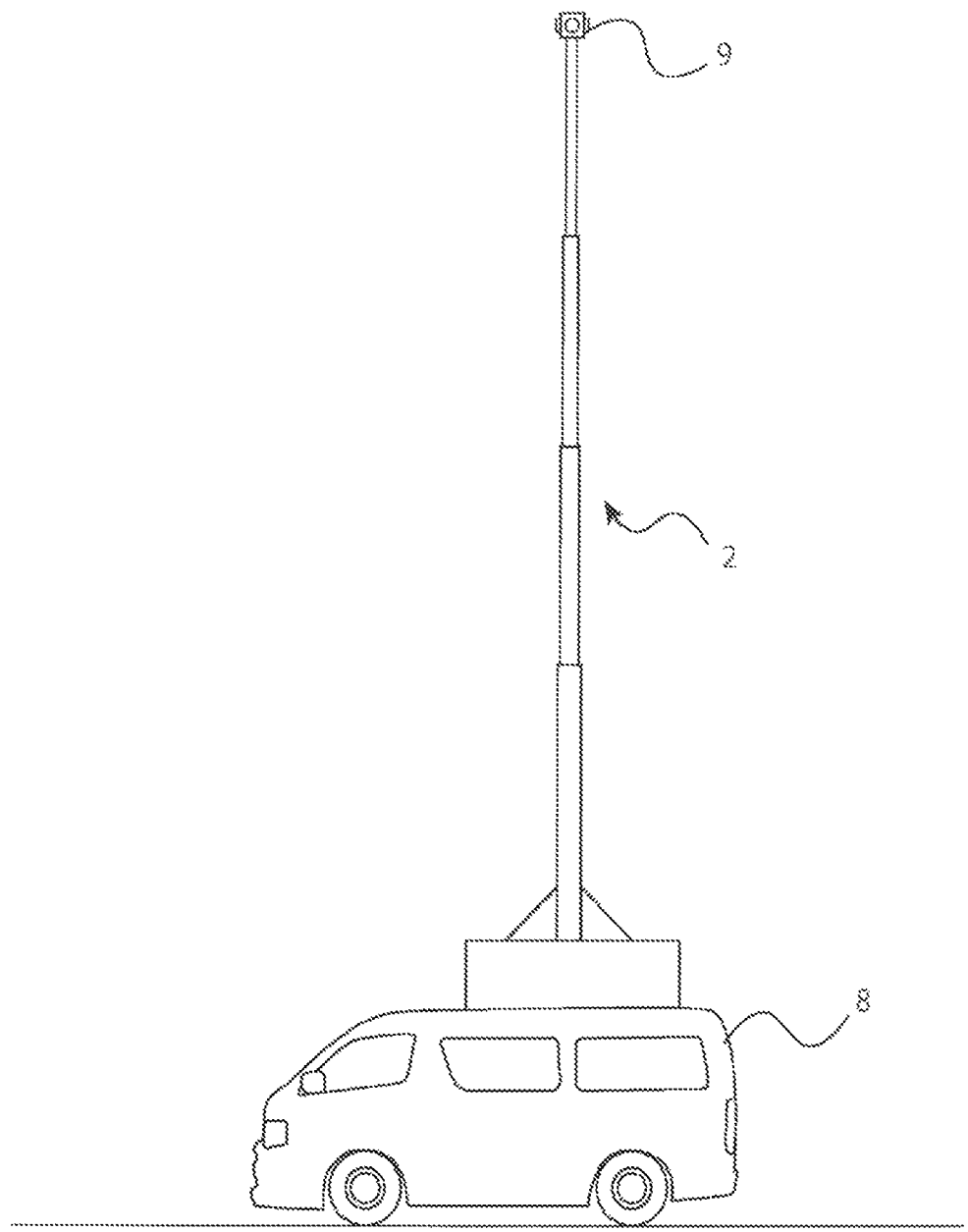
FIG. 9 shows an example in which a camera 9 is mounted on the tip of a telescopic rod 2.

FIG. 9 shows an example in which a camera 9 is mounted on the tip of a telescopic rod 2. Compared to the case where a camera is mounted on a rotary wing aircraft to perform aerial photographing, the risk of falling can be significantly reduced. Further, since the force feed system 1 can be operated by receiving power supply on the ground, it is possible to perform photographing for a long period of time as compared with aerial photographing with a rotary wing aircraft.

Further, as shown in FIG. 9, the force feed system 1 is not arranged on the ground, but can be arranged in the form of a moving means such as an automobile 8. This makes it possible to easily move the telescopic rod 2 to an arbitrary position.

Figure 10:
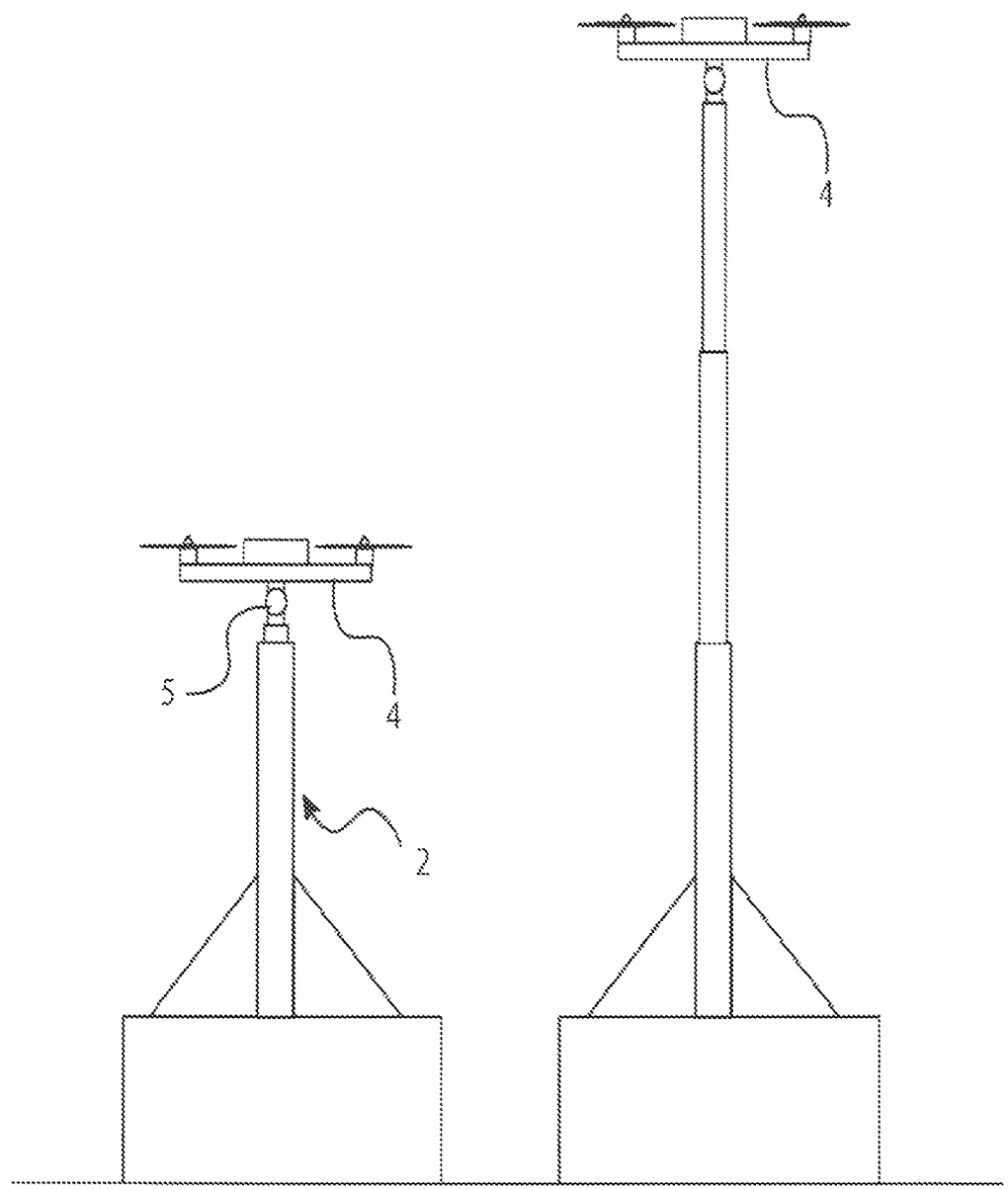
FIG. 10 shows an example in which a rotary wing aircraft 4 is detachably mounted on the tip of a telescopic rod 2.
Figure 11:
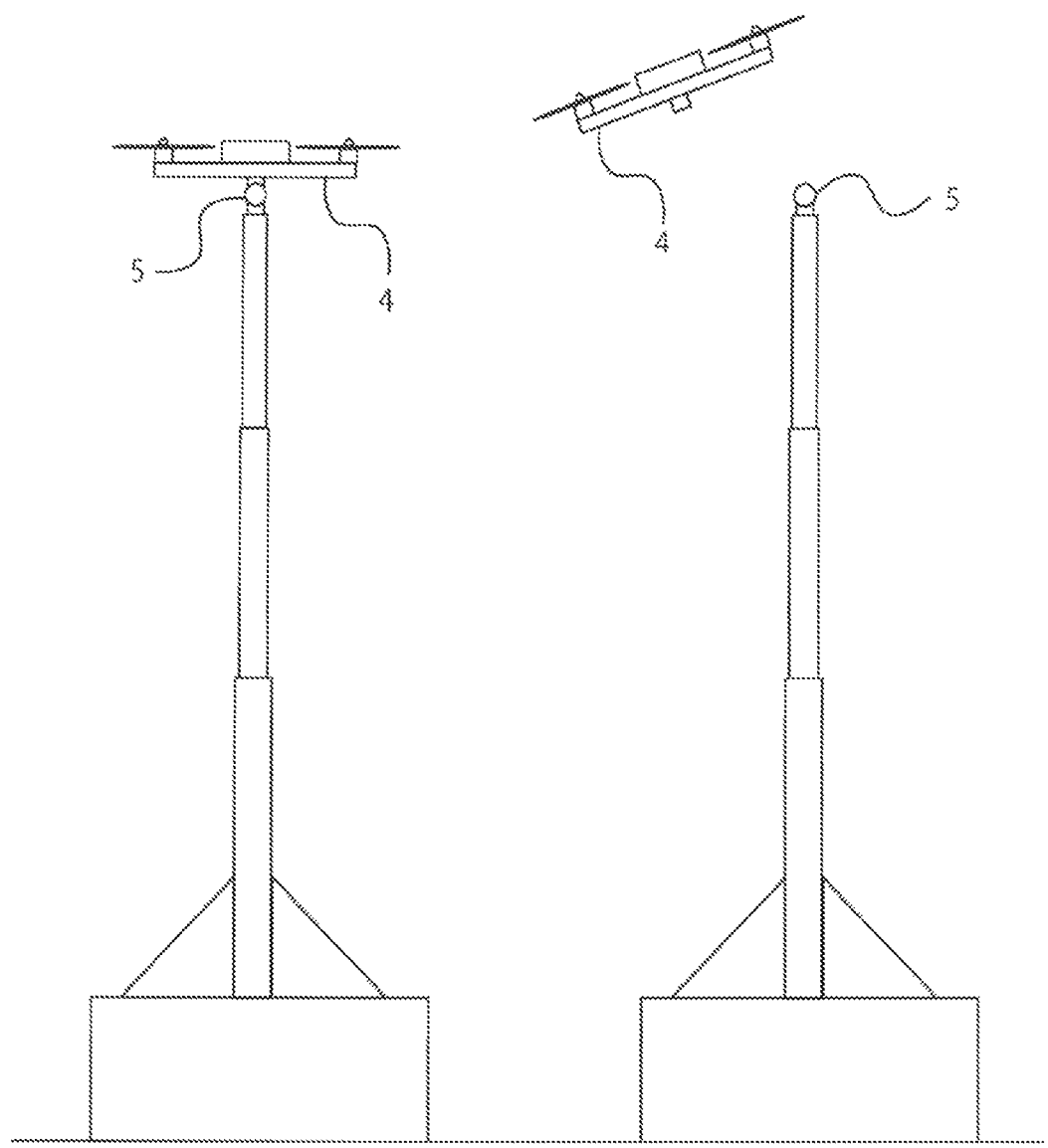
FIG. 11 shows an example in which a rotary wing aircraft 4 is detachably mounted on the tip of a telescopic rod 2.

FIGS. 10 and 11 show an example in which a rotary wing aircraft 4 is detachably mounted on the tip of a telescopic rod 2. Similar to the example of the telescopic rod 2 shown in FIG. 4, the rotary wing aircraft 4 also functions as a posture control means until the telescopic rod 2 is completely extended, but in the examples of FIGS. 10 and 11, the rotorcraft 4 is detachable from the fixture 5. As shown in the right figure of FIG. 11, the rotary wing aircraft 4 can be separated from the telescopic rod 2 to fly. In this way, the rotary wing aircraft 4 can be lifted to the sky to launch. Even when turbulence is generated in the lower layer, the rotary wing aircraft 4 can be safely started to fly.

Figure 12:
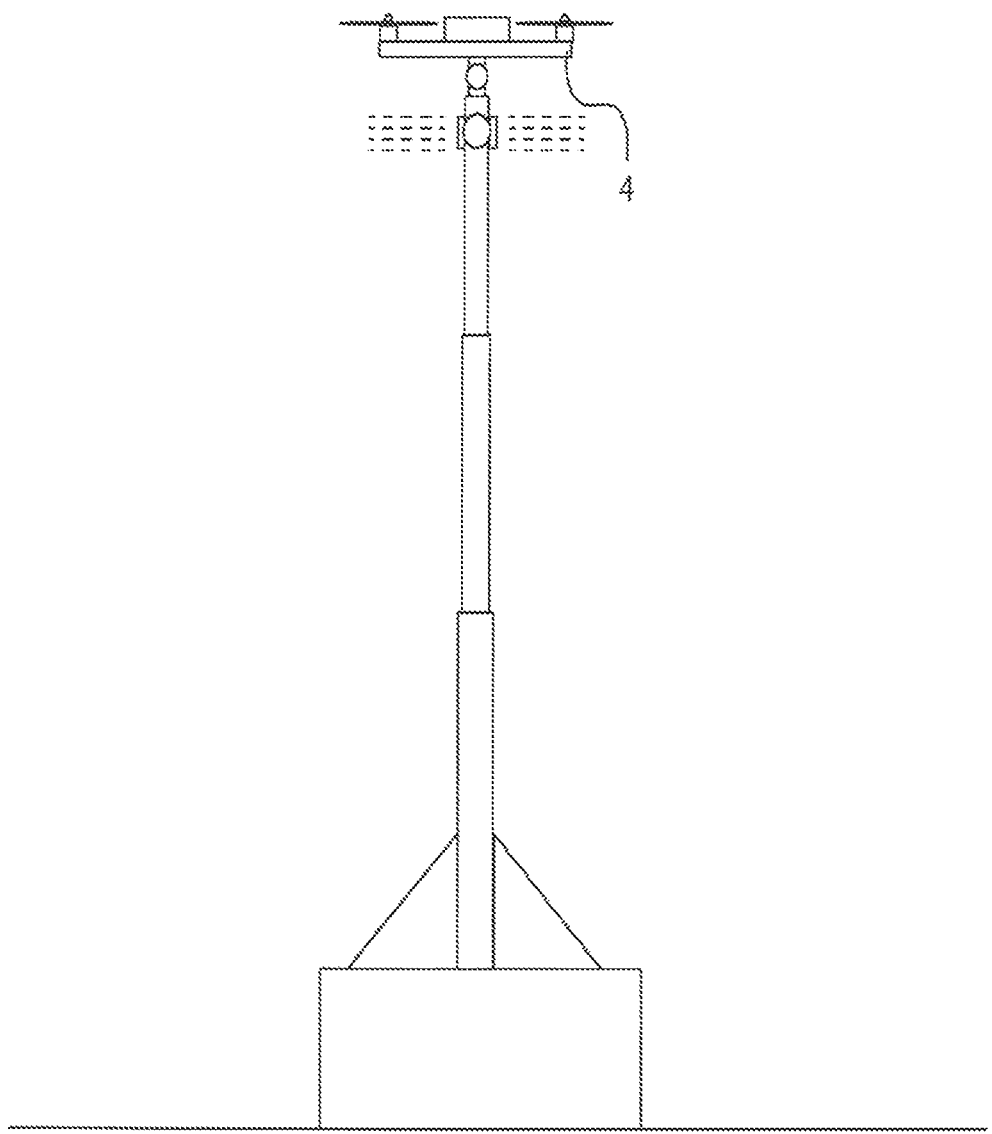
FIG. 12 shows an example of a telescopic rod 2 provided with a force-fed air blow-out hole 3 as a posture control means when the rotary wing aircraft 4 is detachably mounted.
Figure 13:
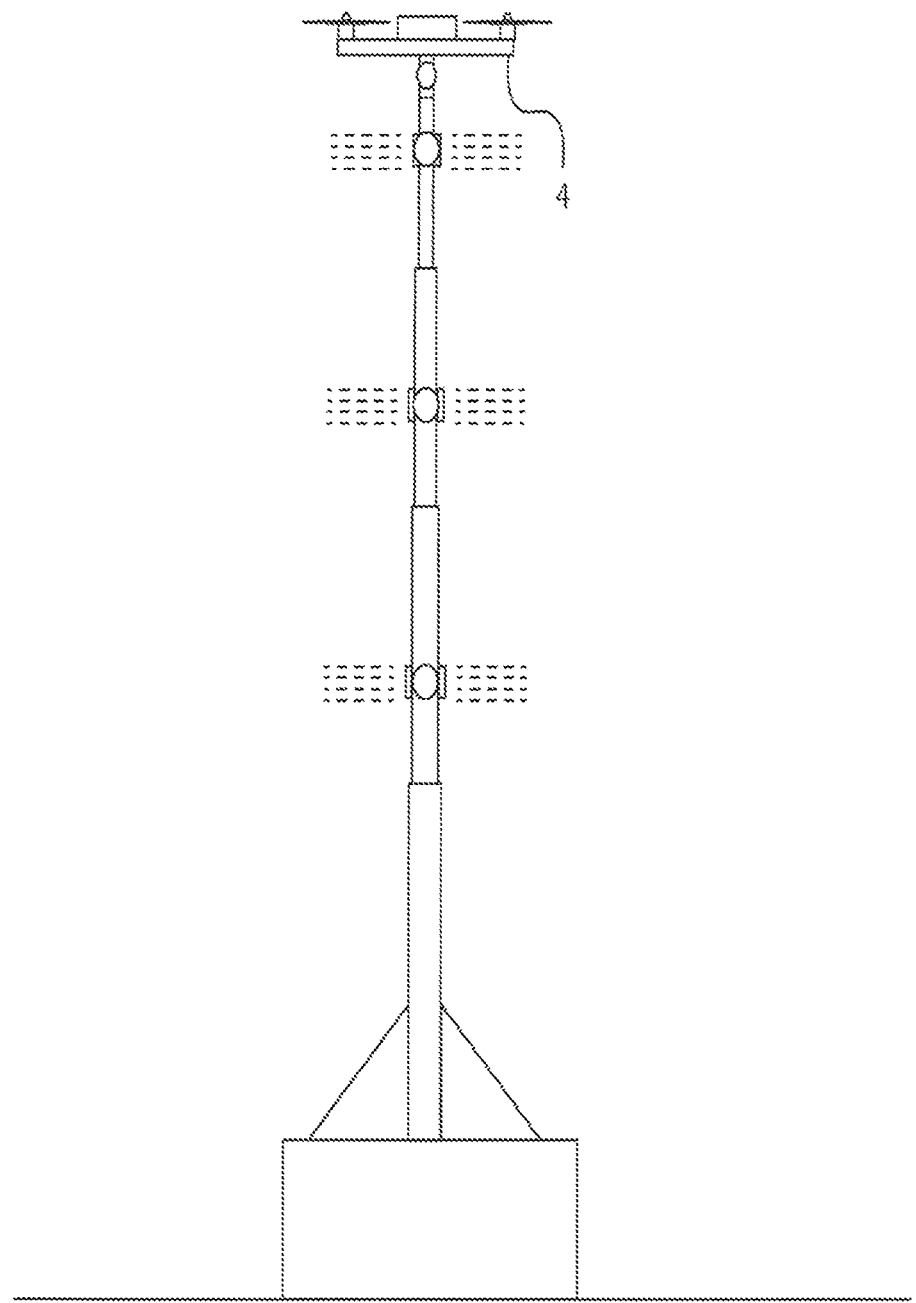
FIG. 13 shows an example of a telescopic rod 2 provided with a plurality of blow-out holes 3 for posture control means when the rotary wing aircraft 4 is detachably mounted.
Figure 14:
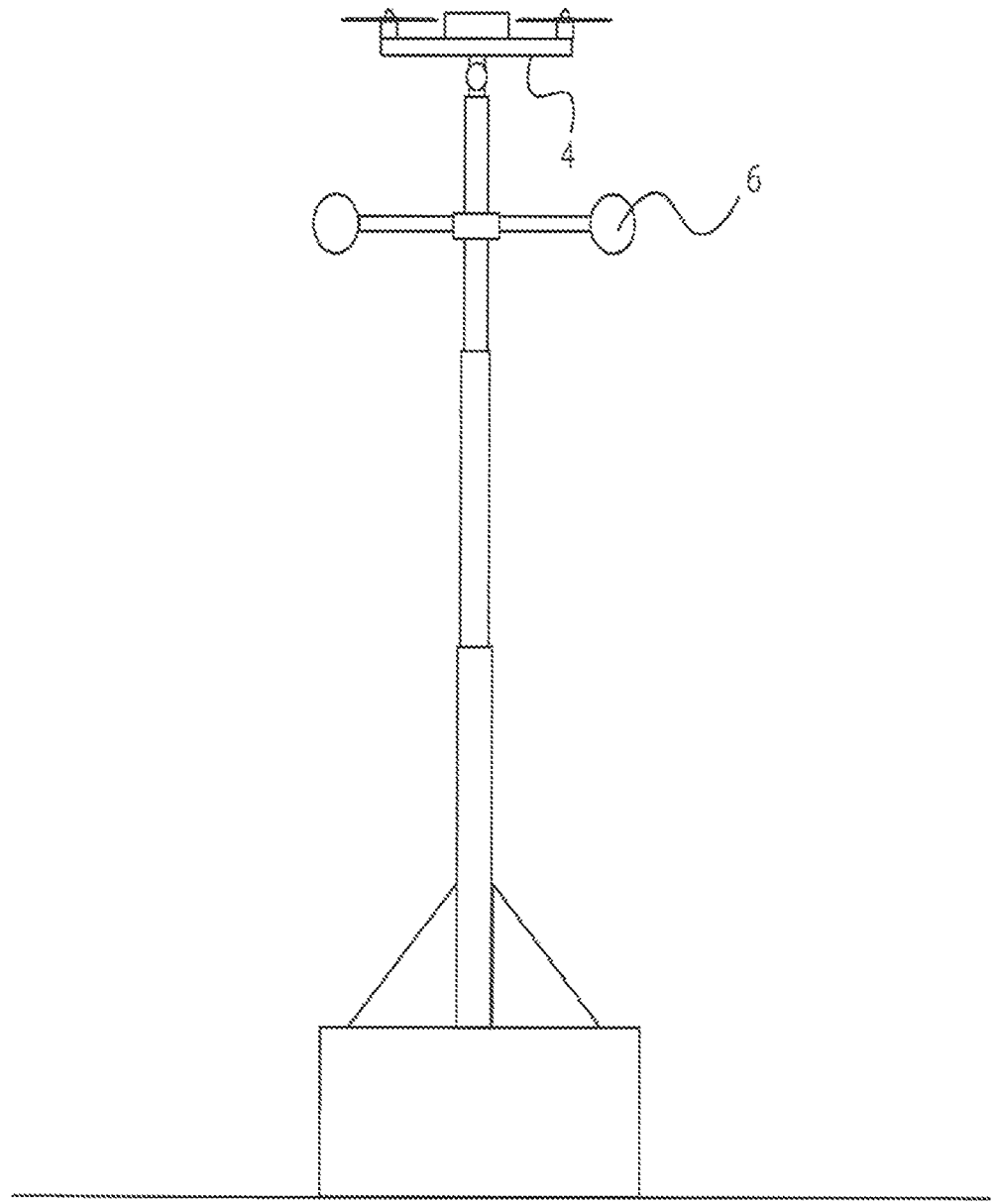
FIG. 14 shows an example of a telescopic rod 2 provided with a counterweight 6 as a posture control means when the rotary wing aircraft 4 is detachably mounted.

When the rotary wing aircraft 4 is detachably mounted on the tip of the telescopic rod 2, the load of the rotary wing aircraft 4 is applied to the telescopic rod 2 and thus, it is preferable to control the posture of the telescopic rod 2 by using the posture control means. When the rotary wing aircraft 4 is mounted detachably, an example of the telescopic rod 2 provided with a force-fed air blow-out hole 3 as the posture control means is shown in FIG. 12, and an example of the telescopic rod 2 provided with a plurality of blow-out holes 3 for the posture control means is shown in FIG. 13. The examples of FIGS. 12 and 13 correspond to the examples of FIGS. 2 and 3, respectively, and the posture of the telescopic rod 2 is maintained by discharging the force-fed air from the blow-out hole 3. FIG. 14 shows an example when a counterweight 6 is provided as the posture control means. The posture of the telescopic rod 2 is maintained even when the load of the rotary wing aircraft 4 is applied by the counterweight 6.

Figure 15:
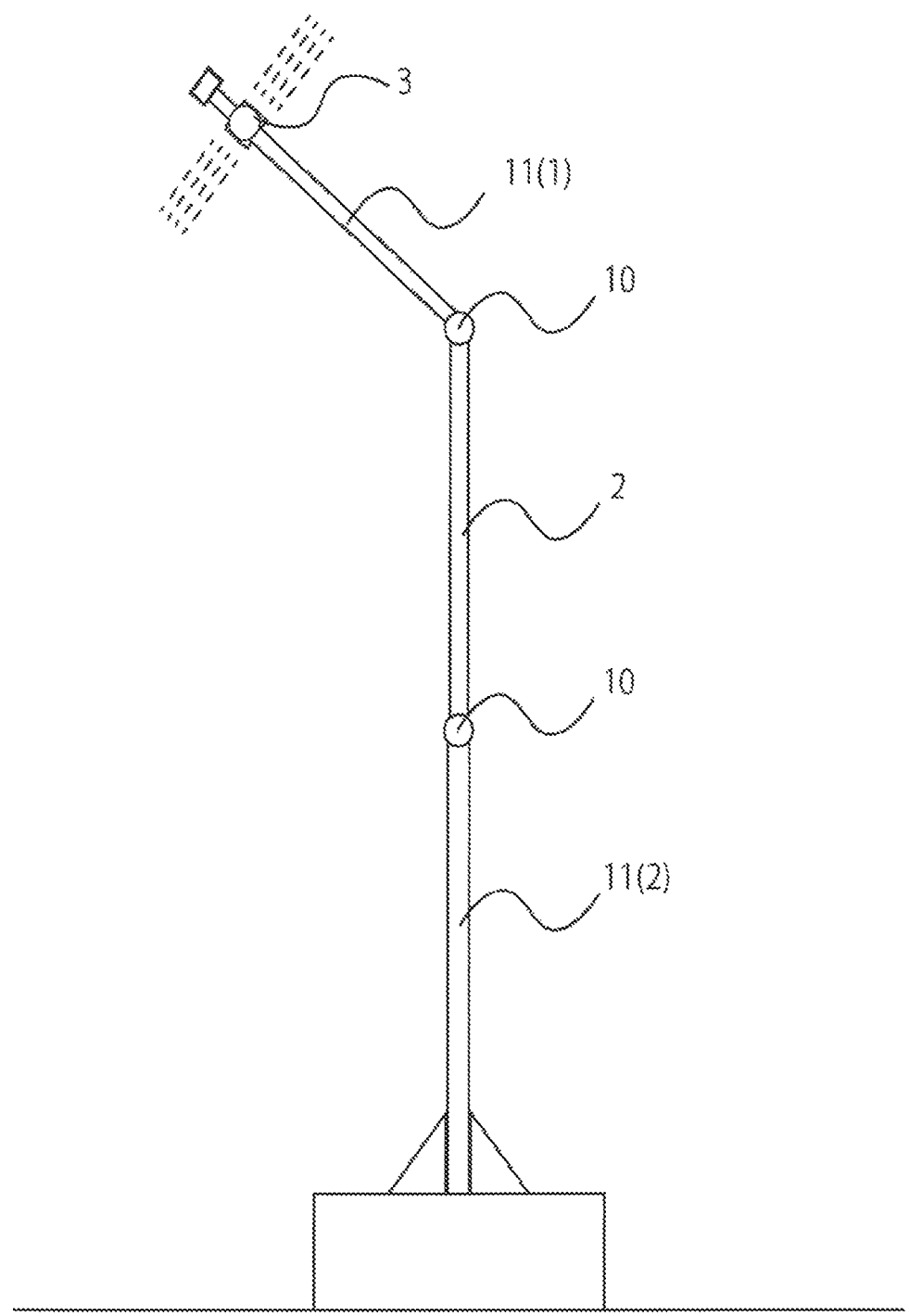
FIG. 15 shows an example in which extension rods 11 are connected to both ends of the telescopic rod 2.

It is also possible to have a joint configuration in which a joint is arranged at the end part of the telescopic rod 2. FIG. 15 shows an example in which extension rods 11 are connected to both ends of the telescopic rod 2. The extension rod 11 and the telescopic rod 2 are connected by a joint 10 having an arbitrary degree of freedom using a ball joint or the like. The extension rod 11 is tubular like the telescopic rod 2, and a cavity is also provided inside the joint 10, so that the telescopic rod 2, the joint 10, and the extension rod 11 communicate with each other. The air from the force feed system 1 enters the extension rod 11(2) and enters the telescopic rod 2 through the joint 10. Further, it enters the extension rod 11(1) through the joint 10. Thereby, the telescopic rod 2 is extended. Further, at least one of the extension rods 11 may be a telescopic rod 2. Further, it may be configured such that the telescopic rod 2 was made into a non-expandable extension rod, and three extension rods were connected by joints.

The posture control means may be provided on either the extension rod 11 or the telescopic rod 2. In the example of FIG. 15, the outlet 3 is provided at the tip of the extension rod 11 (1). Thus, the posture of the extension rod 11(1) is stabilized, and the posture of the telescopic portion 2 connected to the extension rod 11 is also stabilized.

Figure 16:
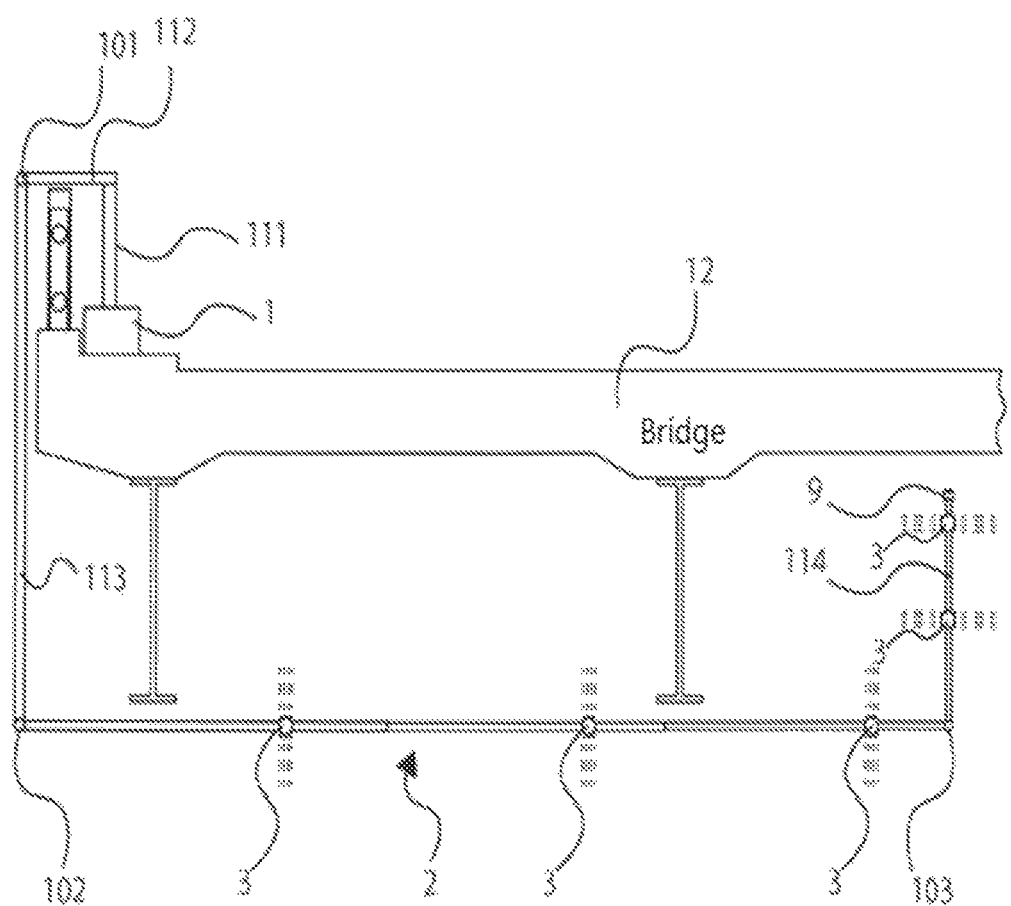
FIG. 16 shows an example in which a joint configuration in which a joint is arranged at an end part of a telescopic rod 2 is applied to an inspection of a bridge 12.

An example of applying the joint configuration to an inspection of the bridge 12 is shown in FIG. 16. An extension rod 111 is connected to the force feed system 1, and the extension rod 112 is refracted and connected to the extension rod 111. The extension rod 112 and the extension rod 113 are connected by a joint 101, and the extension rod 113 and the extension rod 2 are connected by a joint 102. The telescopic rod 2 and the extension rod 114 are connected by a joint 103, and a camera 9 is attached to the end part of the extension rod 114. The extension rods 111, 112 and 113, the expansion rod 2 and the extension rod 114 communicate with each other, and compressed air from the compression system 1 is forcibly fed. The telescopic rod 2 and the extension rod 103 are each provided with a plurality of force-fed air blow-out holes 3. The postures of the telescopic rod 2 and the extension rod 114 are controlled by blowing out the force-fed air from the blow-out hole 3. This stabilizes the posture of the camera 9 and enables high-precision photographing. The bridge 12 can be inspected with high accuracy by using the high-definition image photographed by the camera 9. An extension rod may be arranged instead of the telescopic rod 2. That is, a plurality of extension rods may be connected by joints.

As the posture control means provided in the case of the joint configuration, the above-mentioned counterweight and rotary blade can be used in addition to the blow-out hole 3. An example in which the counterweight 6 is used as the posture control means in the joint configuration is shown in FIG. 17, and an example using the rotary wing aircraft 4 is shown in FIG. 18.

Figure 17:
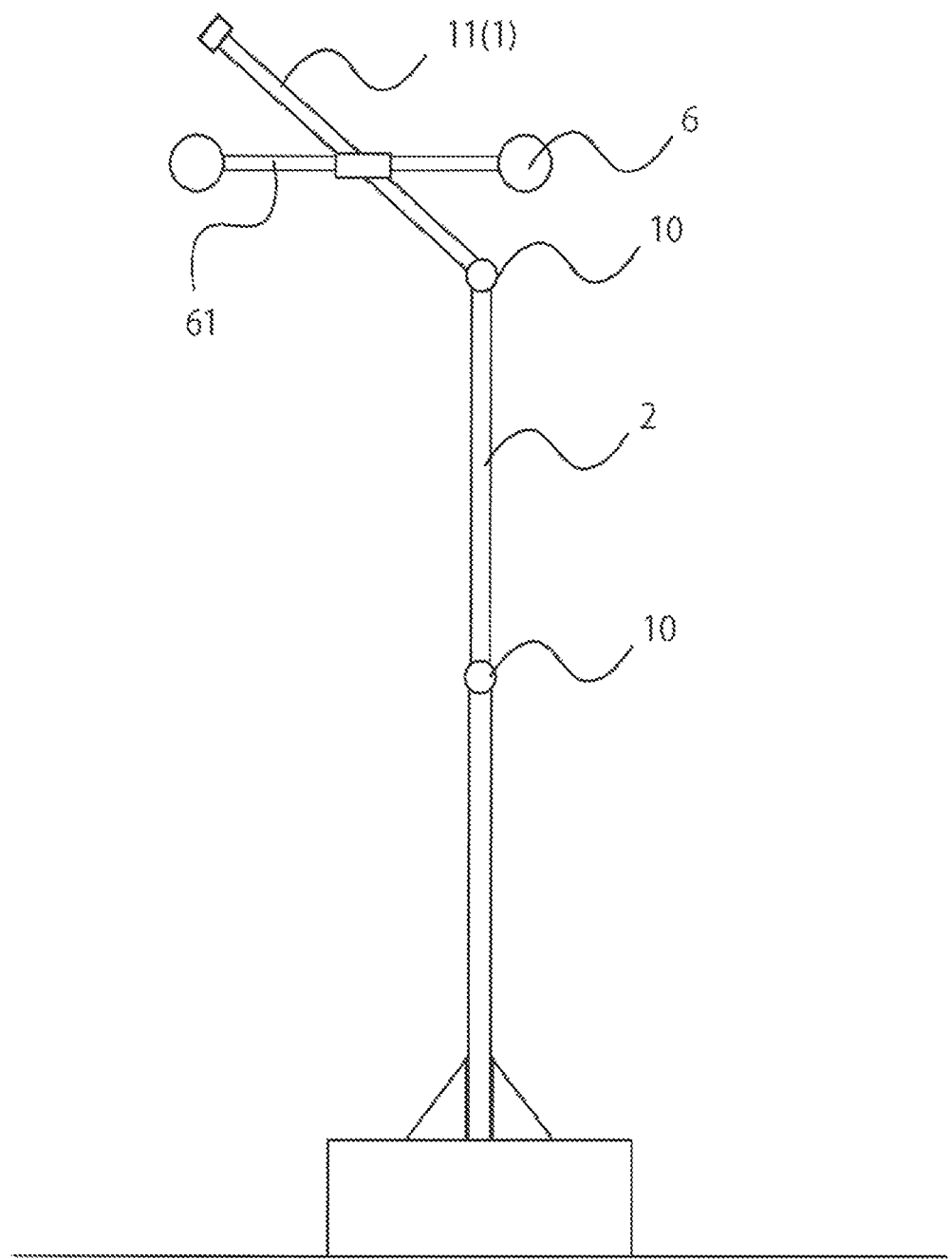
FIG. 17 shows an example in which a counterweight 6 is used as a posture control means when a joint is arranged at the end part of the telescopic rod 2.
Figure 18:
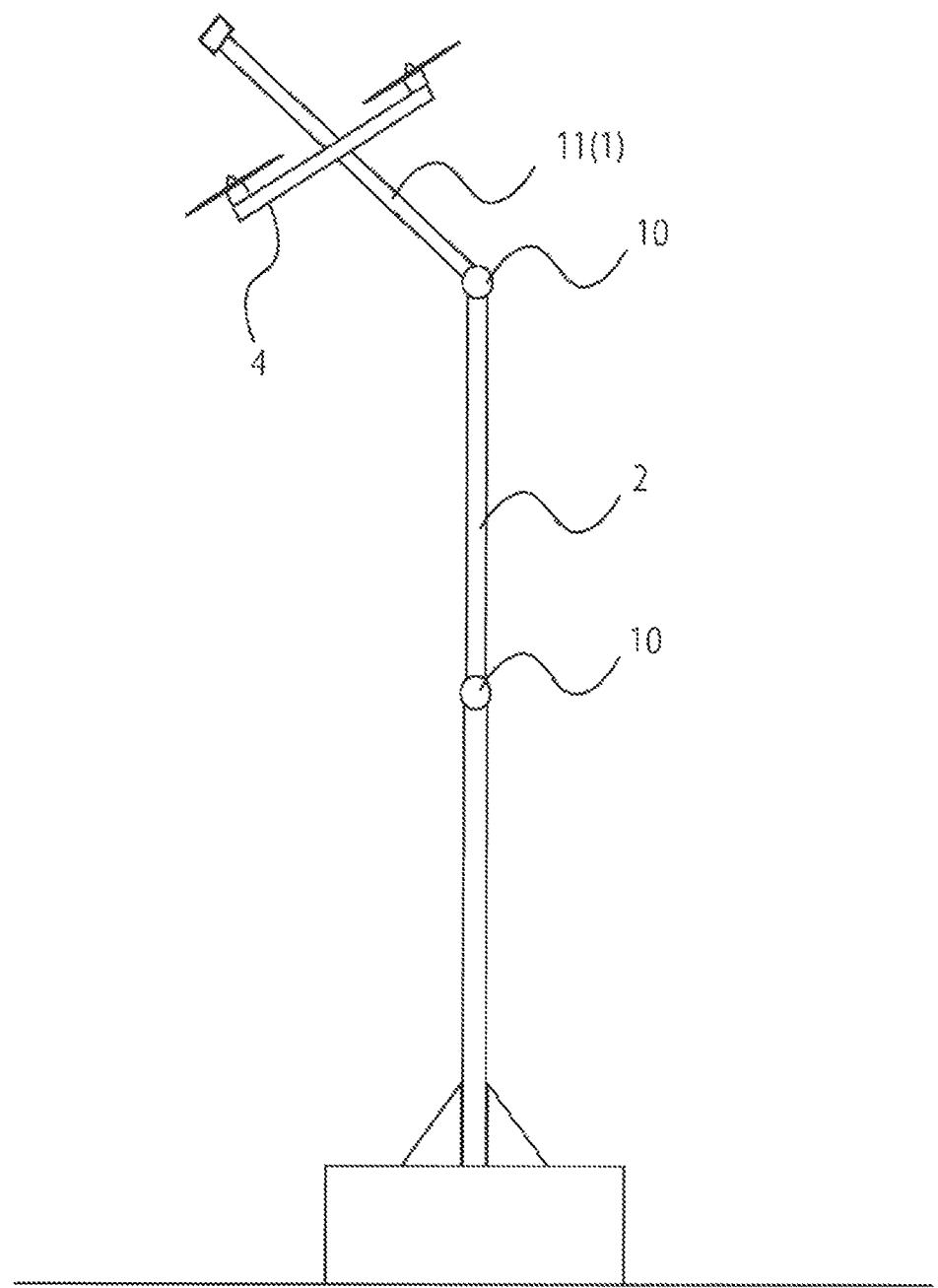
FIG. 18 shows an example in which a rotary wing aircraft 4 is used as a posture control means when a joint is arranged at an end part of a telescopic rod 2.

In the example of FIG. 17, the counterweight 6 is connected to the extension rod 11(1) via an arm 61. The arm 61 is set to be substantially horizontal, thereby stabilizing the posture of the extension rod 11(1). Further, in the example of FIG. 18, a rotary wing aircraft 4 penetrated with the extension rod 11(1) is arranged at the center of the extension rod 11(1). The posture of the extension rod 11(1) is controlled by adjusting the thrust by the rotation of the rotary blade of the rotary wing aircraft 4. The main body of the rotary wing aircraft 4 is provided with a hole (not shown) so that the extension rod 11(1) can be penetrated. The diameter of the hole is made larger than the thickness of the extension rod 11(1), and when the extension rod 11(1) is inclined, the rotary wing aircraft 4 may be arranged with an inclination so that the rotating surface of the propeller of the rotary wing aircraft 4 and the extension rod 11(1) are not orthogonal to each other, and the thrust by the rotary wing aircraft 4 is directed downward as much as possible in the vertical direction. In the example of FIG. 18, the rotary wing aircraft 4 is not horizontal, but a hole may be provided so that the rotary wing aircraft 4 is horizontal. Further, the telescopic rod 2 may be used as an extension rod here as well, and at least one of the extension rods 11 may be a telescopic rod.

Figure 19:
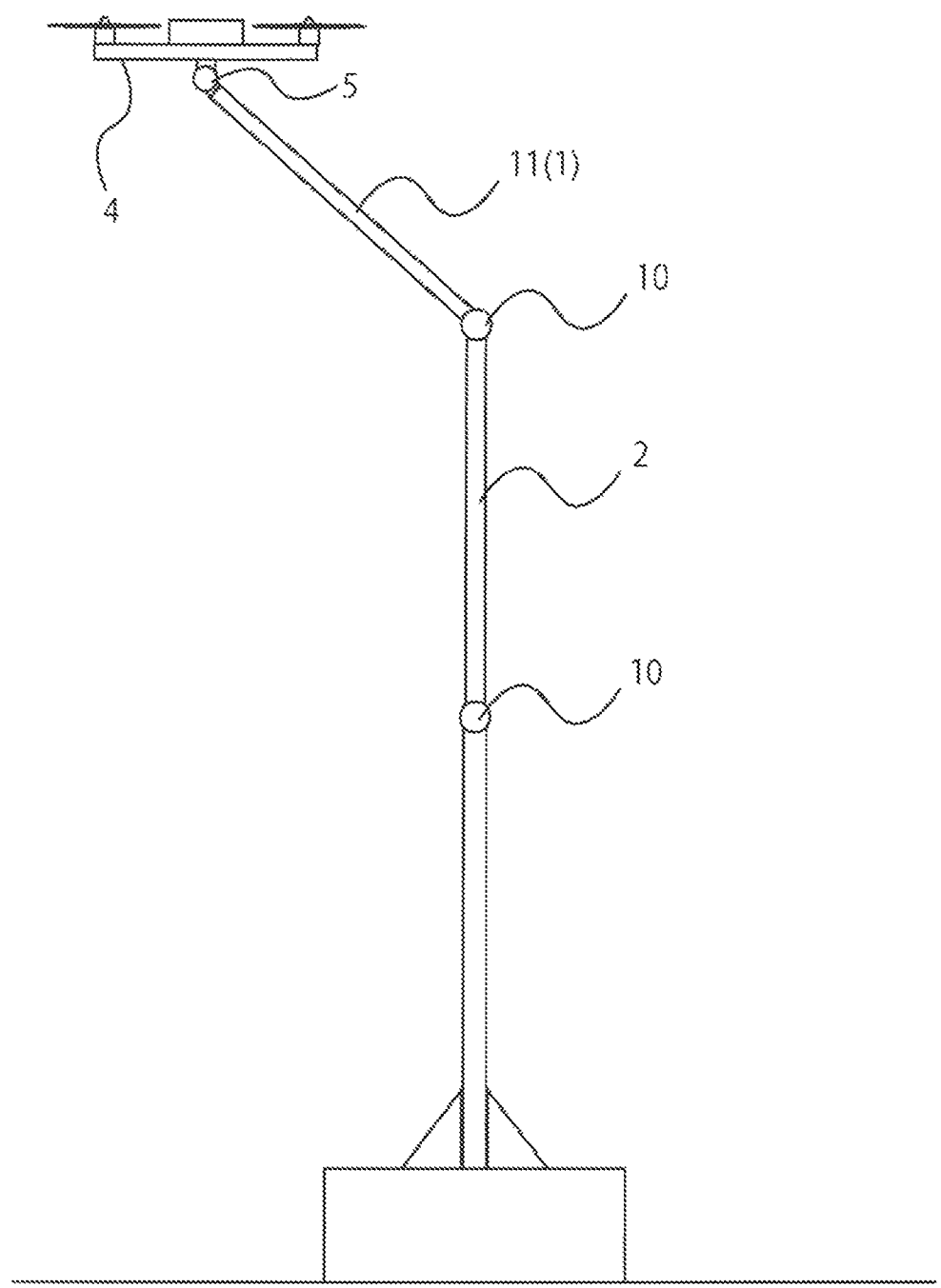
FIG. 19 shows an example in which a rotary wing aircraft 4 is attached to the tip of an extension rod 11 when a joint is arranged at the end part of the telescopic rod 2.

FIG. 19 shows an example in which a rotary wing aircraft 4 is attached to the tip of an extension rod 11 when a joint is arranged at the end part of the telescopic rod 2. In the example of FIG. 19, the fixture 5 is provided at the tip of the extension rod 11(1), and a rotary wing aircraft 4 is detachably attached to the fixture 5. The fixture 5 also functions as a joint, and even when the extension rod 11(1) is bent from the axial direction of the expansion rod 2 and attached, it is assumed that the rotary wing aircraft 4 can be mounted horizontally. The rotorcraft 4 also operates as a posture control means, but it is also possible to fly away from the fixture 5.

As described above, according to the telescopic rod 2 of the present embodiment, it is configured to expand and contract by forcibly feeding gas, so that the telescopic rod 2 can be made of a light member, and can be extended long. When using a hydraulic pressure or the like, it is necessary to improve the airtightness so that the oil inside does not leak. It also needs to be strong enough to withstand the hydraulic pressure and therfore the weight of the telescopic rod 2 increases. However, it is possible to easily reduce the weight by using a gas as in the present embodiment, which makes it possible to expand and contract even if the length exceeds 10 meters.

Further, according to the telescopic rod 2 of the present embodiment, when photographing an image or the like, the camera can be attached to the tip of the telescopic rod 2 or the tip of the extension rod 11 attached to the telescopic rod 2. Therefore, compared to the case where a camera is attached to a flight vehicle such as a rotary wing aircraft to perform aerial photographing, the risk of falling can be reduced, continuous operation for a long time is possible, and the photographing position can be stabilized. In addition, compared to the flight vehicle, it possible to give people an idea of safe operation by using the telescopic rod 2.

Further, the telescopic rod 2 of the present embodiment can be used in various situations in which the rod is appropriate. For example, the telescopic rod 2 can be used for view photography, surveillance cameras, fire lookout towers, bridge inspections, mobile phone base stations, placement of lighting equipment, flag raising, lightning rods, and the like.

The material of the telescopic rod 2 can be flexibly selected according to the application use. For example, when operating as a lightning rod, a highly conductive material such as metal is used, but when a flag or a lightweight camera is lifted to a high place, lightweight materials such as carbon fiber reinforced plastic and bamboo can also be used.

Although the present embodiment has been described above, the above-described embodiment is merely an example for facilitating the understanding of the present invention, and should not be construed as limiting the present invention. The present invention can make some modifications and improvements without departing from the spirit thereof, and the present invention includes an equivalent thereof.

For example, in the present embodiment, compressed air is fed from the force feed system 1, but any gas can be discharged.

Further, in the present embodiment, the telescopic rod 2 extends upward in the vertical direction, but the present invention is not limited thereto, and it can also be configured to extend in any direction (including downward).

Further, for example, in the present embodiment, only the description at the time of extension is given, but at the time of contraction, the force feed system 1 may suck gas from the telescopic rod 2. Thus, the telescopic rod 2 can be automatically contracted even when it is extended downward, and can be used as a material transport (simple crane) at a construction site by utilizing the expansion/contraction operation.

Further, in the present embodiment, the blow-out hole 3 discharges air toward the four sides of the telescopic rod 2, but the present invention is not limited thereto. Less than four blow-out holes 3 may be provided in a direction of less than 4, and four or more blow-out holes 3 may be provided. When providing less than four blow-out holes 3, for example, a flap valve can be provided, and at least one of the air discharge direction and the discharge amount can be adjusted according to the angle of the flap to control the posture. Further, a valve for controlling the flow rate from the blow-out hole 3 may be provided. Further, a control unit to control this valve is provided. The control unit may be connected to the controller by wire or wirelessly so that a user controls the flow rate from the ground.

Further, in the present embodiment, the force feed system 1 is arranged on the ground or the automobile 8, but can be arranged on any object. For example, it can be placed on a moving body such as a ship or a flight vehicle.

DESCRIPTION OF REFERENCE NUMERALS

1: force feed system
2: telescopic rod
3: blow-out hole
4: rotary wing aircraft
5: fixture
6: counterweight
7: flag
8: automobile
9: camera
10: joint
11: extension rod
12: bridge

The invention claimed is:

1. A telescopic rod comprising:
a plurality of cylindrical bodies that extends in an axial direction by a gas forcibly fed to an inside of the cylindrical bodies; and
a posture control means that controls posture of the plurality of cylindrical bodies and is provided on the plurality of cylindrical bodies,
wherein the posture control means comprises a blow-out hole that is provided on a side of the plurality of cylindrical bodies and is exposed to ambient air to discharge the gas directly to the ambient air from the inside of the cylindrical bodies, and
wherein a swing of the plurality of the cylindrical bodies is controlled along a cross-sectional direction relative to the axial direction of the plurality of the cylindrical bodies.

2. The telescopic rod as in claim 1,
wherein an apparatus fixture is provided at a tip part of the plurality of cylindrical bodies.

3. The telescopic rod according to claim 2,
wherein a flight vehicle is detachably attached to the apparatus fixture, and wherein the posture control means controls the posture of the plurality of cylindrical bodies even after the flight vehicle is separated from the telescopic rod.

4. The telescopic rod according to claim 1, wherein the plurality of cylindrical bodies contracts by suction of the gas.

5. The telescopic rod according to claim 1, wherein one or more bendable joints are provided, and wherein the plurality of cylindrical bodies extends at least between a tip part and an uppermost one of the bendable joints or between an adjacent pair of the bendable joints.

6. The telescopic rod according to claim 1, wherein the posture control means includes an inclination sensor that detects an inclination of the plurality of cylindrical bodies, and a control mechanism that controls the posture of the plurality of cylindrical bodies according to the inclination of the plurality of cylindrical bodies.

7. The telescopic rod according to claim 1, wherein the blow-out hole is included in a plurality of blow-out holes, and the side is included in a plurality of sides of the plurality of the cylindrical bodies, and
wherein the plurality of the blow out holes are provided along the sides of the plurality of the cylindrical bodies, respectively.

8. The telescopic rod according to claim 1, wherein the blow out hole is located closer to a tip part than to a center of the plurality of the cylindrical bodies.

9. The telescopic rod according to claim 1, wherein the posture control means comprises a rotor blade and controls a swing of the plurality of the cylindrical bodies along a cross-sectional direction relative to the axial direction of the plurality of the cylindrical bodies.

10. The telescopic rod according to claim 9, wherein the rotor blade is provided closer to a tip part than to a center of the plurality of the cylindrical bodies.

11. The telescopic rod according to claim 9, wherein the rotor blade is provided in a center of the plurality of the cylindrical bodies.

12. The telescopic rod according to claim 10, wherein the rotor blade is provided in the center of the plurality of the cylindrical bodies.

13. The telescopic rod according to claim 1, wherein the posture control means comprises a counterweight,
wherein a connection part is provided at a tip part of the plurality of the cylindrical bodies,
wherein the counterweight is rotatably coupled to the connection part.

14. The telescopic rod according to claim 13, wherein the connection part is a ball joint.

15. The telescopic rod according to claim 1, wherein the plurality of the cylindrical bodies bends in the middle.

16. The telescopic rod as in claim 1, wherein a flap is provided to control an amount of the discharged gas from the blow-out hole by adjusting a size of the blow-out hole.

* * * * *